United States Patent [19]

Pischinger et al.

[11] Patent Number: 4,463,719
[45] Date of Patent: Aug. 7, 1984

[54] AIR-COMPRESSING, SELF-IGNITING ENGINE FOR LIQUID FUEL

[75] Inventors: Franz Pischinger, Im Erkfeld 4, 5100 Aachen, Fed. Rep. of Germany; Cornelis Havenith, Kerkrade, Netherlands

[73] Assignee: Franz Pischinger, Aachen, Fed. Rep. of Germany

[21] Appl. No.: 305,141

[22] Filed: Sep. 24, 1981

Related U.S. Application Data

[62] Division of Ser. No. 110,710, Jan. 9, 1980, Pat. No. 4,370,958.

[30] Foreign Application Priority Data

Jan. 13, 1979 [DE] Fed. Rep. of Germany ....... 2901211

[51] Int. Cl.³ ............................................. F02B 7/02
[52] U.S. Cl. .................... 123/276; 123/299; 123/304; 123/400
[58] Field of Search ............... 123/304, 299, 300, 276, 123/279, 400, 470, 261

[56] References Cited

U.S. PATENT DOCUMENTS

| 747,620 | 12/1903 | Low et al. | 123/304 |
| 1,239,523 | 9/1917 | Rogers | 123/300 |
| 1,767,701 | 6/1930 | Riehm | 123/304 |
| 1,962,283 | 6/1934 | Nordberg | 123/304 |
| 3,534,714 | 10/1970 | Urlaub | 123/276 |
| 4,022,165 | 5/1977 | Eckert et al. | 123/300 |
| 4,149,496 | 4/1979 | Palma | 123/470 |
| 4,273,084 | 6/1981 | Holmer | 123/299 |

FOREIGN PATENT DOCUMENTS

| 851570 | 10/1952 | Fed. Rep. of Germany | 123/300 |
| 1301607 | 8/1969 | Fed. Rep. of Germany | 123/300 |

*Primary Examiner*—Andrew M. Dolinar
*Attorney, Agent, or Firm*—Becker & Becker, Inc.

[57] ABSTRACT

An air-compressing, self-igniting combustion engine for liquid fuels, in an arrangement that includes a combustion chamber depression in a piston for receiving injected fuel predominantly in the vicinity of the wall thereof and for receiving rotating combustion air at the time of fuel injection. Oxygen-containing fuel that is reluctant to ignite is injected through a first injection device into the combustion chamber depression; through a second injection device there is injected fuel that is willing to ignite, for instance oil fuel, gas oil or Diesel fuel, for initiating and/or maintaining the fuel combustion in the combustion chamber depression. Furthermore, the injection times of the fuel that is willing to ignite and the oxygen-containing fuel that is reluctant to ignite overlap each other. The first and second injection nozzles each are arranged with an injection pump and are rigidly coupled and have a common injection adjuster. Both injection nozzles are combined in a single-nozzle body. One injection nozzle is embodied as a two-hole nozzle which is inclined at an acute angle in the twist direction, the fuel streams of which however form such a small differential angle with respect to each other that the droplets of the oxygen-containing fuel that is unwilling to ignite in essence form a common droplet veil or mist. The injection nozzles are so directed that a separate droplet veil or mist results for both fuels.

10 Claims, 6 Drawing Figures

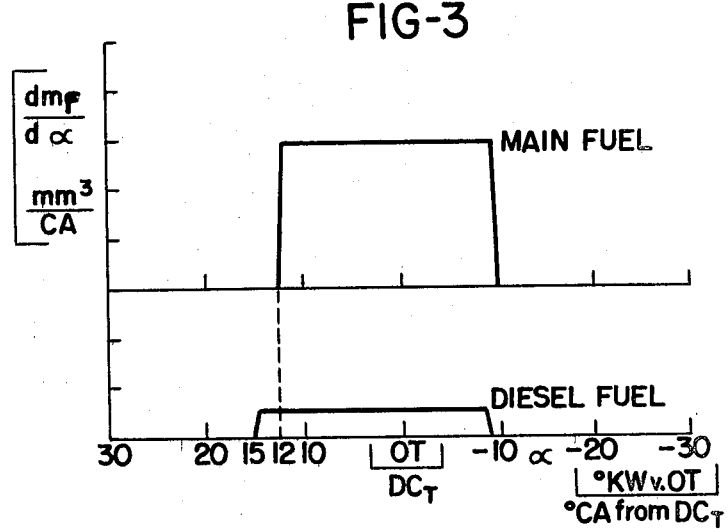
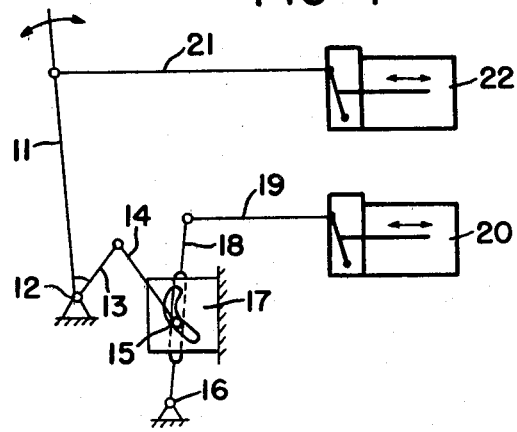

FIG-5
FIG-6
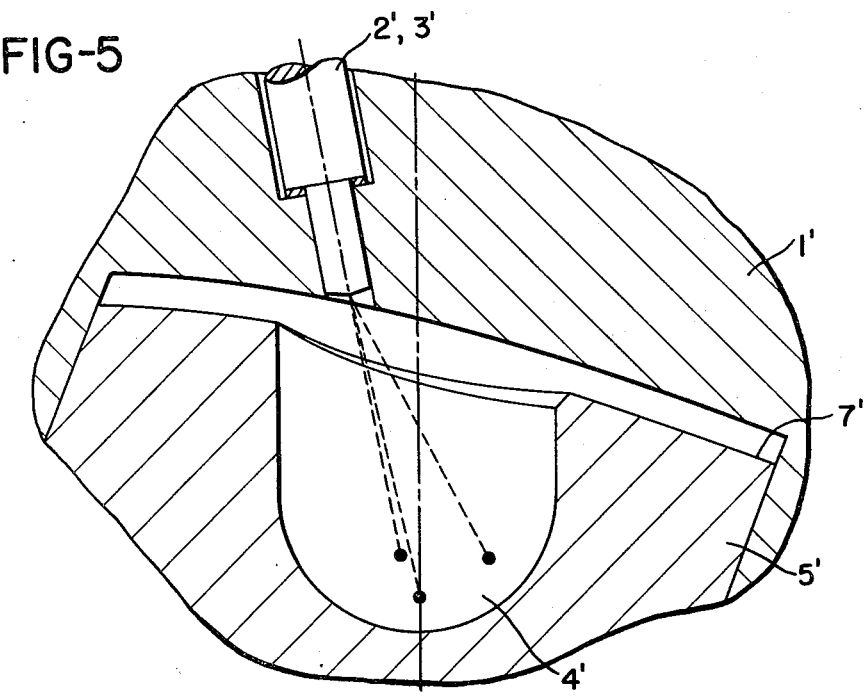
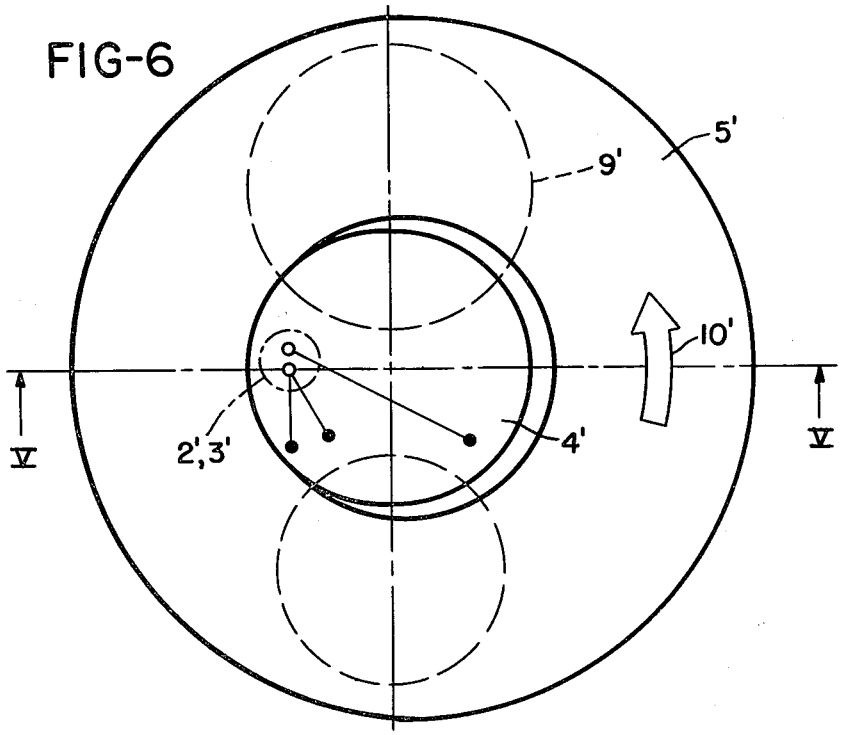

AIR-COMPRESSING, SELF-IGNITING ENGINE FOR LIQUID FUEL

This is a divisional application of co-pending parent application Ser. No. 110,710-Pischinger et al filed Jan. 9, 1980 and belonging to the Assignee of the present invention, now U.S. Pat. No. 4,370,958-Pischinger et al issued Feb. 1, 1983.

The present invention relates to an air-compressing, self-igniting combustion machine or engine for liquid fuels which has a combustion chamber depression in the piston; into this depression the fuel is predominantly injected in the vicinity of the wall thereof, for example parallel to the depression wall, and in the depression the combustion air rotates at the time of injection. The present invention also relates to an apparatus for carrying out the foregoing operation of the engine.

Efforts are under way, within the framework of waste or exhaust gas regulations and increasing oil costs, as well as oil shortages, to replace the oil fuel, gas oil or Diesel fuel necessary for a Diesel motor.

It is an object of the present invention on the one hand to replace a predominant proportion of the Diesel fuel, while still maintaining a good efficiency, by an alternative fuel, and on the other hand to improve the exhaust or waste gas quality of Diesel motors.

This object, and other objects and advantages of the present invention, will appear more clearly from the following specification in connection with the accompanying drawings in which:

FIG. 3 is a schematic representation of the injection quantities as a function of the crank angle for both fuels;

FIG. 4 is a schematic illustration of a common quantity control of both injection pumps for both fuels;

FIG. 5 is a section taken along line V—V of FIG. 6 through an embodiment which is a modification in accordance with the invention; and FIG. 6 is a plan view of the piston of FIG. 5 taken in the direction of the depression axis.

Figure 1:
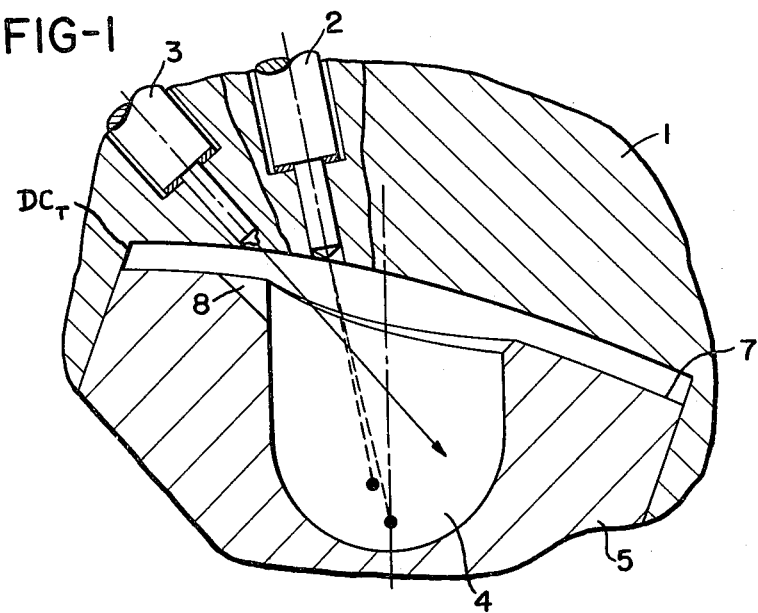
FIG. 1 is a section taken along line 1—1 of FIG. 2 through an embodiment of the present invention through a piston with an arrangement of two injection nozzles in the indicated cylinder head.

The present invention is characterized primarily by an arrangement of the aforementioned type, whereby an oxygen-containing fuel which is reluctant or unwilling to ignite, and which is subsequently designated as the main fuel, is injected into the combustion chamber depression through an injection device. Furthermore, an ignitible fuel or fuel willing to ignite, for instance oil fuel, gas oil, Diesel fuel and the like, is injected into the combustion chamber depression through a second injection device for initiating and/or maintaining the combustion. In addition, the injection times of the ignitible fuel and the oxygen-containing fuel that is reluctant to ignite overlap each other. In this connection, the oxygen-containing fuel which is reluctant to ignite is injected near the wall, and the Diesel fuel is injected in a direction toward the middle of the depression. By injecting the main fuel near the wall, a fuel-air mixture ring forms in the combustion chamber depression and is supported by the circulating movement of the suction air. According to the present invention, this fuel-air mixture now only needs to be ignited by the oil fuel, gas oil, or Diesel fuel. The present inventive arrangement makes it possible to use fuels which are not automatically or in themselves capable of igniting at the pressures and temperatures conventional with Diesel motors.

German Offenlegungsschrift 27 49 806 discloses a method for operation of a Diesel motor by admixing methanol to the suction air. In this heretofore known method, in contrast to the present invention, the methanol-air mixture is compressed in the cylinder, and Diesel fuel is injected into the compressed mixture for initiating the ignition. With this embodiment, only very nominal quantities of methanol can be added, since otherwise at full load the knocking, and at partial load the limits of ignition stoppage, are exceeded. Additionally, the fuel consumption, the carbon monoxide emission, the hdyrocarbon emission, and the aldehyde emission rise greatly in the partial load range. Even the suggested prewarming of the suction air and/or the utilization of ignition acceleration means are insufficient to avoid these disadvantages.

With the present inventive arrangement, it has proven advantageous to begin injection of the oil fuel, gas oil, Diesel fuel before injection of the oxygen-containing fuel which is unwilling to ignite. Contrary to the previously existing belief, there has particularly been found that it is very well possible to inject the oxygen-containing fuel that is unwilling to ignite into the already burning mixture formed by the Diesel fuel stream. According to the present invention, it is also possible, already before the beginning of combustion of the injected Diesel fuel, to inject the oxygen-containing fuel that is unwilling to ignite into the combustion chamber depression in an advantageous manner without, by the cooling effect thereof, disadvantageously influencing the ignition lag or delay of the Diesel fuel. Under such circumstances it is also possible to bring about an earlier start of injection with the use of fuels which have a high heat of vaporization. In so doing, a sure ignition is guaranteed without reaching the knock limit or boundary.

If oxygen-containing fuels are used which are reluctant to ignite and which, in spite of the external initiation of combustion, cannot themselves maintain the combustion, then it is expedient according to a further embodiment of the present invention that oil fuel, gas oil or Diesel fuel be injected during the entire duration of the reluctant fuel injection. Consequently, it is also possible to utilize a very high volume proportion of the oxygen-containing fuel that is reluctant to ignite. Additionally, it can also be expedient to extend the duration of the Diesel fuel injection to beyond the injection duration of the oxygen-containing fuel that is reluctant to ignite. A considerable lowering of the emission of harmful gaseous materials is made possible hereby.

For control or regulation of load and speed of the combustion engine, it is possible to maintain constant the injected Diesel fuel quantity in all load ranges of the combustion engine, and only to change the injected quantity of the main fuel. This has proven especially sufficient with combustion engines having predominantly constant load and constant speed.

If, however, the inventive arrangement is used in a combustion engine having varying speed and/or load, for instance for driving a power vehicle, it can be advantageous to vary both the Diesel fuel quantity and the main fuel quantity as a function of load and/or speed. Under these circumstances, a quantity control of the Diesel fuel is sufficient in relatively narrow ranges.

For cold starting the combustion engine, it is sufficient in most cases to increase the injected quantity of Diesel fuel, preferably to double such quantity. Simultaneously, a small quantity of main fuel that is unwilling to ignite can also be injected therewith.

In accordance with the field of use or application of the combustion engine, and at extremely low external temperatures, the starting procedure of the combustion engine can be considerably more advantageous if during the cold start only Diesel fuel is injected, and injection of the main fuel is begun only after a low idling speed is achieved.

At full load, a ratio of volume of 1:30 of Diesel fuel to oxygen-containing fuel unwilling to ignite has been found to be completely sufficient.

A device for the present inventive arrangement is characterized primarily by having a second injection nozzle per combustion chamber, by having the first injection nozzle for the oxygen-containing main fuel unwilling to ignite and the second injection nozzle for the fuel, for instance oil fuel, gas oil, or Diesel fuel, willing to ignite, and by having the injection times of the ignitible fuel and the main fuel overlap each other. The advantage of this device consists especially in that a previously utilized combustion engine can be converted to the present inventive method solely by adding a second complete injection system.

With a combustion engine having a basically cylindrical combustion chamber trough or depression, the length and diameter of which are approximately at a ratio of 1:1, and with the depression inclined with respect to the cylinder axis of the combustion engine and with the depression thus having a region of a longest mental line thereof and in which the main fuel is injected into the region of the longest mantle line of the depression, a preferred embodiment is obtained by having the second injection nozzle providing one or more streams or flows, including at least one stream directed into the combustion chamber depression, with this second injection nozzle being arranged in the edge region of the combustion chamber depression near the first injection nozzle. The injection of the fuel that is unwilling to ignite into a relatively deep combustion chamber depression has, among others, the advantage that the fuel is prevented from arriving on the cylinder wall and washing away the lubricating film necessary at this location.

An especially suitable position of the second injection nozzle finds the second injection nozzle arranged next to the first injection nozzle in the opposite direction of the air twist or angular momentum, with the nozzle-hole axis being at an angle of approximately 45° to the cylinder axis and being inclined in the twist direction within the combustion chamber depression. Hereby the result is obtained that, by way of the air twist, the flame of the Diesel fuel stream is deflected in a direction onto the mixture deposited near the wall and formed of air and oxygen-containing fuel that is unwilling to ignite; in this connection, the inclination of the Diesel fuel stream assures an ignition flame upon the entire depth of the combustion chamber depression. The special advantage of this inventive arrangement of the injection stream devices consists in that, as a consequence of the speed-dependent twist flow, the positions of both fuel-air-mixtures are optimally matched or adapted to each other in conformity with the particular motor speed, as a result of which, in the entire motor performance graph or field, with a low combustion noise, there is attained an advantageous fuel consumption as well as a low emission of soot and noxious gaseous materials.

In order to attain a good mixture formation for the oxygen-containing fuel that is unwilling to ignite, it is advantageous to embody the first injection nozzle as a two-hole nozzle which is inclined at an acute angle in the twist direction; however, the fuel streams of the two-hole nozzle form such a small differential angle to each other that the droplets of the oxygen-containing fuel that is unwilling to ignite essentially form a common droplet veil or mist or fog (haze).

In this connection, it has been found especially advantageous if the nozzle openings of the injection nozzles are embodied in such a manner that, with approximately equal free stream length in the combustion chamber depression, separate but adjacent droplet veils are formed for both fuels. Accordingly, the advantage is attained that the droplet veil of main fuel that is unwilling to ignite is engaged along its entire length from the flank by the burning ignition oil stream, so that a uniform ignition of the oxygen-containing fuel that is unwilling to ignite occurs.

If the second injection nozzle is arranged externally of the combustion chamber depression in the edge region, a recess is provided at the combustion chamber depression for setting free the combustion material or fuel stream. A sure burning-through of the fuel-air mixture, located above the piston toward the end of the combustion process is achieved by igniting the Diesel fuel stream up to the root of the stream. A very low hydrocarbon emission is attained in this manner. Additionally, by this arrangement of the second injection nozzle, there is attained the advantage that the injection nozzle opening is located in the range of lower temperatures, so that carbonization and obstruction or clogging of the opening cross section can be avoided.

A further advantage of the arrangement of the second injection nozzle next to the first injection nozzle and before the inlet valve, both seen in opposite direction of the air twist, is recognizable therein that fresh air flow entering into the combustion chamber cools the tip of the second injection nozzle and accordingly additionally protects against thermal overloading. The arrangement of both injection nozzles in the direct vicinity of one another additionally offers the advantage that fastening of the nozzle holder can be effected by a common clamping strap or shoe.

Another embodiment of the apparatus, especially in connection with the described cylindrical combustion chamber depression, provides arrangement of the second injection nozzle for the Diesel fuel in the edge region of the combustion chamber depression opposite to the first injection nozzle, and with the nozzle-hole axis directed transversely through the combustion chamber depression at an angle of approximately 45° to the cylinder axis. Consequently, a combustion stream of Diesel fuel results in the combustion chamber depression along which the oxygen-containing fuel that is unwilling to ignite can then ignite.

A device for carrying out a quantity control is characterized by a combined actuation of the adjustment lever of both injection pumps. This common quantity control can occur either by a coupling of both adjustment levers directly to the operator lever, or can be undertaken subject to intermediate connection of an adjustment regulator which individually or jointly engages one or both adjustment levers.

A combined quantity control for both fuels permits the greatest possible portion of the Diesel fuel to be replaced by oxygen-containing fuel that unwilling to ignite, since hereby a load-dependent matching or adaptation of the Diesel fuel quantity can be undertaken. A further reduction of the noxious material emission is likewise made possible thereby.

If the inventive arrangement is utilized with small or compact-built combustion engines, the arrangement of a second injection nozzle in the cylinder head for each combustion chamber can lead to structural difficulties. In this case, it is advantageous to combine both injection nozzles in a single nozzle body, and to arrange the same at the location of the first injection nozzle in the combustion chamber. In so doing, the additional advantage is realized that the essentially greater mass flow of oxygen-containing fuel that is unwilling to ignite cools the entire nozzle body, avoiding the danger of overheating the Diesel fuel nozzle, through which only a small quantity of fuel flows.

Because of the separation of the function of the ignition of the mixture formation of the oxygen-containing fuel that is unwilling to ignite, it is possible to use quite different oxygen-containing fuels or fuel mixtures that are unwilling to ignite.

For example, it has been proven possible to use methanol with up to 30% by volume impurities, for example, water, as the oxygen-containing fuel that is unwilling to ignite, so that also inexpensive water-containing raw methanol can be utilized.

A further application possibility is the utilization of liquefied gas as a fuel that is unwilling to ignite. Especially the spatial separation of both fuels within the combustion chamber depression as separated droplet veils makes it possible to avoid ignition delay or knocking and noise problems as they exist with other methods which utilize liquefied gas as a fuel.

Referring now to the drawings in detail, the cylinder head 1 indicated in FIG. 1 has two injection nozzles 2 and 3, the streams of which are directed into a combustion chamber recess, trough or depression 4 of a piston 5. The piston 5 in FIG. 1 is illustrated shortly before its upper dead center point.

The hole axis of the injection nozzle 3 is provided for oil fuel, gas oil or Diesel fuel. The nozzle opening thereof is arranged externally of the combustion chamber depression in the region of the combustion chamber depression edge. So that the injection stream located in the nozzle-axial direction can enter into the combustion chamber depression unhindered with every crank-angle positioning, the piston head or crown 7 has a recess 8 in the region of the injection nozzle 3. Additionally, it is apparent that the stream discharging from the injection nozzle 3 is directed substantially diagonally, and at an angle of approximately 45° to the cylinder axis, into the combustion chamber depression 4.

The first injection nozzle 2 is, in this example, a two-hole nozzle, the full axes of which likewise are directed into the combustion chamber depression or recess. In this connection, the fuel streams are directed substantially wall-parallel with respect to the combustion chamber depression wall, and the streams form such a small differential angle with respect to each other that the droplets of the fuel discharging from the nozzle in essence form a common droplet veil, mist or fog.

The combustion chamber depression has a length and a diameter in the ratio of approximately 1:1, and the combustion chamber depression has a non-throttling opening essentially in the middle of the piston-head.

Figure 2:
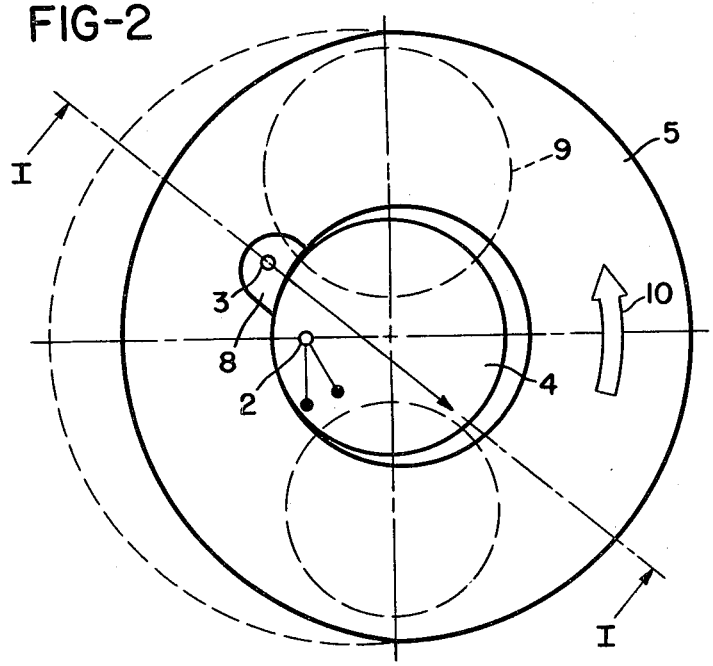
FIG. 2 is a plan view of the piston of FIG. 1 taken in the direction of the depression axis.

FIG. 2 illustrates a plan view of the piston in the direction of the depression axis. From this view it is apparent that the first injection nozzle 2 injects the fuel close to the wall. Likewise, it is apparent from the illustration that the injection nozzle 3 is arranged in the vicinity of the inlet valve 9. The arrow 10 shows the twist direction of the air in the cylinder. Consequently, the nozzle opening of the injection nozzle 3 can be cooled by fresh air which is entering or flowing in so that a carbonization of the nozzle opening is precluded.

In FIG. 3, the injection quantities of both fuels are illustrated over or with respect to the crank angle. The designations in FIG. 3 are defined as follows: $DC_T$=upper or top dead center position of the piston; °CA=degrees crank angle; and $(dm_F/d_\alpha)$=change of fuel quantity as a function of change of crank angle. In the upper half of the diagram is set forth the oxygen-containing fuel that is unwilling to ignite and which is used as the main fuel in accordance with the present invention; in the lower part of the diagram is set forth the oil fuel, gas oil or Diesel fuel which is used as ignition oil is accordance with the present invention. Apparent from this illustration is that the injection of the Diesel fuel begins at approximately 15° crank angle before the upper dead center point, and the injection ends or terminates at approximately 10° crank angle after the dead center point. The main fuel, which is reluctant to ignite, is injected approximately in the region of 12° crank angle before the upper dead center point until 10° crank angle after the upper dead center point. Accordingly, first Diesel fuel is injected to initiate the combustion, and this Diesel fuel ignites and then ignites the main fuel, continuously supporting the latter during the further combustion.

FIG. 4 schematically illustrates a possibility for combined quantity control of both fuels. The operating lever 11 is effective directly upon the adjustment lever 21 for quantity control of the injection pump 22 for the main fuel. The lever 11 at its linkage point 12 is rigidly connected with a lever 13 which on the other hand is pivotally connected with the control lever 14. The free end of the control lever 14 is guided by way of a sliding block 15 in a stationarily arranged curve or cam plate 17, whereby simultaneously the control lever 18, which is pivotally journalled at 16, is moved by the sliding block 15. The control lever 18, in turn, is connected with the adjustment lever 19 for quantity control of the injection pump 20 for the Diesel fuel. The curve plate 17 is embodied in such a way that after exceeding a low idling speed, by adjustment of the operator lever, the injection quantity of the Diesel fuel is reduced with increasing load of the motor, while in so doing the injection quantity of the main fuel, which is unwilling to ignite, is increased. The Diesel fuel quantity is kept substantially constant during a further adjustment of the operating lever 11 in the partial load range and only the main fuel quantity is changed. The curve plate 17 is furthermore embodied in such a way that with increasing load, up to the full load state, the injection quantity of the Diesel fuel is again slightly increased in order to obtain a longer lasting ignition flame front, as a result of which, particularly with methanol as the oxygen-containing fuel that is reluctant to ignite, a better burning-through of the mixture is assured.

During the starting procedure, none, or only a nominal quantity, of the oxygen-containing fuel that is reluctant to ignite is injected into the combustion chamber, though, however, for better starting of the motor, a greater quantity of Diesel fuel is injected. This Diesel fuel supplementary quantity is brought about by the corresponding selection of the speed regulator, while in this connection the regulator of the main-fuel pump is embodied in such a way that up to starting of the motor, only that quantity of main fuel is injected which is predetermined in accordance with purpose of utilization or application. The described schematic relationship of FIG. 4 is suitable only for a regulation or control when not working under load. If this is not the case, an adjustment regulator in common for both injection pumps can engage against the operator lever 11.

FIGS. 5 and 6 are illustrations similar to FIGS. 1 and 2, though now the first and second injection nozzles are combined in a single nozzle body and similar parts or components thereof are identified with prims being added to appropriate reference numeral designations.

The present invention is, of course, in no way restricted to the specific disclosure of the specification and drawings, but also encompasses any modifications within the scope of the appended claims.

What is claimed is:

1. An air-compressing, self-igniting combustion engine having at least one piston and a cylinder axis therewith, said engine comprising:

at least one piston combustion chamber depression having an edge region as well as a wall and adapted to receive rotating combustion air during fuel injection therein;

a first injection nozzle for said combustion chamber depression adapted to inject reluctant to ignite oxygen-containing fuel predominantly in the vicinity of the wall of said depression; and a second injection nozzle for said combustion chamber depression adapted to inject ignitible fuel therein in an overlapping relationship with the reluctant to ignite oxygen-containing fuel from said first injection nozzle, said combustion chamber depression being basically cylindrical, with its length and diameter being approximately in the ratio of 1:1, said depression being inclined with respect to the cylinder axis of said engine, said first ignition nozzle being adapted to inject reluctant to ignite fuel into a region of said inclined depression, said second injection nozzle being adapted to provide at least one stream, including at least one stream directed into said combustion chamber depression, said second injection nozzle being arranged in the edge region of said combustion chamber depression.

2. An engine according to claim 1, in which said second injection nozzle is arranged in the edge region of said combustion chamber depression angularly relative to said first injection nozzle, the nozzle-hole axis of said second injection nozzle being directed transversely through said combustion chamber depression at an angle of approximately 45° to the cylinder axis.

3. An engine according to claim 1, in which said second injection nozzle is arranged next to said first injection nozzle in a direction counter to the air twist, the nozzle-hole axis of said second injection nozzle being at an angle of approximately 45° to the cylinder axis and being inclined in the twist direction within said combustion chamber depression.

4. An engine according to claim 1, in which the edge of said combustion chamber depression is provided with a recess in such a way that said recess is adapted to receive fuel from said second injection nozzle.

5. An engine according to claim 4, which includes an air inlet valve, said recess being arranged in the direction of the air twist directly adjacent said inlet valve.

6. An engine according to claim 1, which includes injection pumps respectively operatively associated with said first and second injection nozzles; and adjustment levers respectively associated with each of said injection pumps; operating means for operating said adjustment levers; and control means operatively associated with said adjustment levers and adapted to effect a change in the fuel quantity ratio as a function of at least one of the parameters of load and speed of said engine.

7. An engine according to claim 6, in which both of said injection pumps are provided with a common adjustment regulator.

8. An engine according to claim 6, in which said injection pumps are rigidly coupled and are provided with a common spray adjuster.

9. An engine according to claim 1, in which said first and second injection nozzles are combined in a single nozzle body.

10. An air-compressing, self-igniting combustion engine having at least one piston and a cylinder axis therewith, said engine comprising:

at least one piston combustion chamber depression having an edge region as well as a wall and adapted to receive rotating combustion air during fuel injection therein;

a first injection nozzle for said combustion chamber depression adapted to inject reluctant to ignite oxygen-containing fuel predominantly in the vicinity of the wall of said depression; and a second injection nozzle for said combustion chamber depression adapted to inject ignitible fuel therein in an overlapping relationship with the reluctant to ignite oxygen-containing fuel from said first injection nozzle, said first injection nozzle being a two-hole nozzle inclined so as to spray in the twist direction of the combustion air, the fuel streams of said two-hole nozzle being adapted to form such a small differential angle to one another that emerging droplets of said reluctant to ignite fuel are adapted to essentially form a common droplet veil.

* * * * *